_United States Patent_ [19]

Silverman et al.

[11] Patent Number: 4,608,357

[45] Date of Patent: Aug. 26, 1986

[54] CATALYTIC CRACKING WITH MULLITE COMPOSITION PROMOTED COMBUSTION OF CARBON MONOXIDE

[75] Inventors: Lance D. Silverman, New York, N.Y.; Barry K. Speronello, River Edge, N.J.

[73] Assignee: Engelhard Corporation, Menlo Park, N.J.

[21] Appl. No.: 577,092

[22] Filed: Feb. 6, 1984

[51] Int. Cl.[4] .................. B01J 20/16; C01B 31/20
[52] U.S. Cl. ..................... 502/84; 423/247; 208/113
[58] Field of Search .............. 502/84, 68, 80; 423/247, 131, 658.5; 208/120

[56] References Cited

U.S. PATENT DOCUMENTS

| | | | |
|---|---|---|---|
| 1,857,402 | 5/1932 | Rockwell | 502/84 |
| 2,536,122 | 1/1951 | Bertorelli et al. | 423/131 |
| 2,840,618 | 6/1958 | Hecht | 502/84 |
| 3,450,645 | 6/1969 | McEvoy | 502/68 |
| 3,515,681 | 6/1970 | Flank et al. | 502/68 |
| 3,577,218 | 5/1977 | Brown et al. | 502/262 |
| 3,647,718 | 3/1972 | Haden, Jr. et al. | 502/68 |
| 3,657,154 | 4/1972 | Haden, Jr. et al. | 502/68 |
| 3,903,020 | 9/1975 | Sergeys et al. | 502/304 |
| 3,909,454 | 9/1975 | Azrad et al. | 502/84 |
| 3,914,377 | 10/1975 | Anderson et al. | 423/247 |
| 3,932,309 | 1/1976 | Graham et al. | 502/223 |
| 4,039,480 | 8/1977 | Watson et al. | 502/9 |
| 4,080,313 | 3/1978 | Whittam | 502/84 |
| 4,098,676 | 7/1978 | Robson | 208/111 |
| 4,157,316 | 6/1979 | Thompson et al. | 502/334 |
| 4,323,542 | 4/1982 | Joy | 502/333 |
| 4,426,319 | 1/1984 | Blanchard et al. | 502/241 |
| 4,454,241 | 6/1984 | Pine et al. | 502/68 |

FOREIGN PATENT DOCUMENTS

| | | | |
|---|---|---|---|
| 634580 | 1/1962 | Canada | 502/84 |
| 1050956 | 3/1979 | Canada | 502/68 |
| EP20799 | 1/1981 | European Pat. Off. | 423/247 |
| 51-2437 | 1/1976 | Japan | 502/84 |
| 52-12153 | 4/1977 | Japan | 502/84 |
| 715739 | 9/1954 | United Kingdom | 502/84 |

_Primary Examiner_—Andrew H. Metz
_Assistant Examiner_—O. Chaudhuri
_Attorney, Agent, or Firm_—Inez L. Moselle

[57] ABSTRACT

The present invention provides novel catalyst products for promoting the combustion of carbon monoxide, particularly in catalytic cracking units, especially FCC units. The improved products of the invention comprise one or more catalytically active metals selected from the group consisting of palladium or mixtures of palladium and at least one other precious metal on a porous silica-alumina support obtained by leaching sufficient silica from shaped particles of calcined clay with caustic solution to impart porosity to the particles. The calcined clay from which silica is leached to impart porosity is preferably kaolin clay that has been calcined at a temperature and for a time sufficient to substantially convert the clay into mullite and silica, whereby the support particles consist essentially of mullite crystals.

11 Claims, No Drawings ns of FCC units has gained broad commercial acceptance. Some of the history of this development is set forth in U.S. Pat. No. 4,171,286 and U.S. Pat. No. 4,222,856. In the earlier stages of the development, the precious metal was deposited on the particles of cracking catalyst. Present practice is generally to supply a promoter in the form of solid particles containing a metal, such particles being physically separate from the particles of cracking catalyst. The precious metal, or compound thereof, is supported on particles of suitable carrier material and the promoter particles are usually introduced into the regenerator separately from the particles of cracking catalyst. The particles of promoter that are not removed from the system as fines are cocirculated with cracking catalyst particles during the cracking/stripping/regeneration cycles.

CATALYTIC CRACKING WITH MULLITE COMPOSITION PROMOTED COMBUSTION OF CARBON MONOXIDE

FIELD OF THE INVENTION

This invention relates to an improved solid particulate oxidation promoter and to the use thereof in regenerating a coke-contaminated cracking catalyst with simultaneous controlled catalyzed combustion of carbon monoxide to carbon dioxide within a regeneration zone to produce regenerated catalyst and flue gas. More particularly, this invention relates to solid attrition-resistant particles comprising palladium supported on solid porous particles of silica-alumina obtained by leaching (extracting) silica from particles of calcined clay with an alkaline solution. The novel promoter particles of the invention are particularly adapted for use in the well-known continuous cyclic fluid catalytic cracking (FCC) of hydrocarbons with a fluidized cracking catalyst, in the absence of added hydrogen, to produce premium products such as motor fuels.

Present-day continuous cyclic FCC processes utilize fluidizable catalyst particles containing a crystalline zeolitic aluminosilicate component (usually an ion-exchanged form of a synthetic crystalline faujasite) and a porous inorganic oxide matrix. This type of catalyst must be regenerated to low carbon levels, typically 0.5% or less, to assure that the catalyst particles possess desired activity and selectivity before the particles are recycled to a conversion zone for catalytic upgrading of hydrocarbon feedstock. In most regenerators the combustible solids deposited on the spent solid catalyst particles from the cracking zone are burned in a confined regeneration zone in the form of a fluidized bed which has a relatively high concentration of catalyst particles (dense phase). A region of lower solids concentration (dilute phase) is maintained above the dense phase. A typical regeneration cycle is described in U.S. Pat. No. 3,944,482 to Mitchell.

High residual concentrations of carbon monoxide in flue gases from regenerators have been a problem since the inception of catalytic cracking processes. The evolution of FCC has resulted in the use of increasingly high temperatures in FCC regenerators in order to achieve the required low carbon levels in the regenerated crystalline aluminosilicate catalysts. Typically, present day regenerators now operate at temperatures in the range of about 1100° F. to 1350° F. when no promoter is used and result in flue gases having a $CO_2/CO$ ratio in the range of 1.5 to 0.8. The oxidation of carbon monoxide is highly exothermic and can result in so-called "carbon monoxide afterburning" which can take place in the dilute catalyst phase, in the cyclones or in the flue gas lines. Afterburning has caused significant damage to plant equipment. On the other hand, unburned carbon monoxide in atmosphere-vented flue gases represents a loss of fuel value and is ecologically undesirable.

Restrictions on the amount of carbon monoxide which can be exhausted into the atmosphere and the process advantages resulting from more complete oxidation of carbon monoxide have stimulated several approaches to the provision of means for achieving complete combustion of carbon monoxide in the regenerator.

BACKGROUND OF THE INVENTION

The use of precious metals to catalyze oxidation of carbon monoxide in the regenerators of FCC units has gained broad commercial acceptance. Some of the history of this development is set forth in U.S. Pat. No. 4,171,286 and U.S. Pat. No. 4,222,856. In the earlier stages of the development, the precious metal was deposited on the particles of cracking catalyst. Present practice is generally to supply a promoter in the form of solid particles containing a metal, such particles being physically separate from the particles of cracking catalyst. The precious metal, or compound thereof, is supported on particles of suitable carrier material and the promoter particles are usually introduced into the regenerator separately from the particles of cracking catalyst. The particles of promoter that are not removed from the system as fines are cocirculated with cracking catalyst particles during the cracking/stripping/regeneration cycles.

Promotor products that are presently used on a commercial basis in FCC units include calcined spray dried microspheres of kaolin clay impregnated with a small amount (e.g., 100 or 500 ppm) of platinum. Reference is made to U.S. Pat. No. 4,171,286 (supra) for its disclosure as to the production and properties of the calcined clay support material and the resulting promoter particles. Other commercially used promoters are obtained by impregnating a source of platinum on microspheres of high purity alumina. Commercially available sources of alumina-supported platinum were analyzed by the assignee of the instant patent application and found to analyze in the range of about 300 to 1000 ppm of platinum. The selection of platinum as the precious metal in the aforementioned commercial products appears to reflect a preference for this metal that is consistent with prior art showings that platinum is the most effective group VIII metal for carbon monoxide oxidation promotion in FCC regenerators. See, for example, FIG. 3 in U.S. Pat. No. 4,107,032 and the same figure in U.S. Pat. No. 4,350,614. The figure illustrates the effect of increasing the concentration of various species of precious metal promoters from 0.5 to 10 ppm on $CO_2/CO$ ratio.

At least one promoter for FCC units that has been used commercially contains a precious metal (palladium) in addition to platinum. The support is gamma alumina. Our analysis of a sample of the product indicates that it contains 479 ppm Pd and 1154 ppm Pt (VF basis). To the best of our knowledge, the supplier of the product did not ascribe any particular benefit to the presence of palladium. In fact, a subsequent sample from the same supplier did not contain any palladium. A reasonable explanation for the presence of palladium with platinum is based on our understanding that such material was obtained by grinding waste material produced in the manufacture of oxidative automotive emission control catalysts. It is well known that catalysts for use in automotive emissions control generally include palladium because of its effectiveness in "light-off".

Another disclosure of the use of palladium in a mixed metal promoter of carbon monoxide oxidation in an FCC unit appears in U.S. Pat. No. 4,222,856. This patent describes promoters containing from about 500 ppm to about 1% by weight of group VIII metals on a solid support, preferably gamma-alumina. The patent discloses that the promoter preferably contains a mixture of platinum and palladium but no reason is advanced to explain the preference. U.S. Pat. No. 4,222,856 also teaches that a preferred proportion of platinum to palladium is from about 1.5–4.0:1 by weight and that the concentration of combined platinum and palladium is preferably from about 1,500 to 4,500 ppm. With respect to the support for the metal, there is an expressed preference for using a material of "friable" nature to permit removal of the promoter with the flue gas. In contrast, the calcined clay support of U.S. Pat. No. 4,171,286 and other commercially used promoters are attrition resistant and the bulk of the promoter particles circulate with catalyst inventory through the cracking, stripping and regenerator zones.

Recent patents disclose a preference for including palladium in promoters that are intended to oxidize oxides of sulfur in regenerator flue gases from FCC units. GB No. 2,104,406, for example, discloses the use of palladium in combination with platinum, osmium, iridium, rhenium, or rhodium to control sulfur oxides. Palladium purportedly helps to minimize the production of undesirable oxides of nitrogen in flue gas. As another example, U.S. Pat. No. 4,350,615 discloses the use of a palladium plus ruthenium based promoter for the control of emissions of nitrogen oxides and sulfur oxides. Neither G.B. No. 2,104,406 nor U.S. Pat. No. 4,350,615 discloses any advantage of palladium containing promoters for enhanced CO oxidation activity.

The present invention contemplates a novel combustion promoter in which the support is composed of attrition-resistant porous particles of caustic leached calcined clay, preferably particles of kaolin clay calcined to convert the kaolin into a mixture of mullite and free (leachable) silica, whereby the leached calcined clay consists essentially of aggregates of mullite rendered porous as a result of the extraction of free silica. The thermal conversion of kaolin clay to mullite is well known in the ceramics art and mullite is frequently mentioned as a support for various catalysts. A high purity kaolin clay can theoretically be converted by high temperature calcination into about 64% weight percent mullite. The remainder is an amorphous or crystalline silica, depending on the calcination conditions. The addition of various sources of alumina such as bauxite increases the amount of mullite that can be obtained from a given amount of kaolin, thereby reducing the amount of free silica. Similarly, mullite obtained from various other sources of silica and alumina, such as kyanite or bauxite, will not necessarily contain free silica.

The mullitization reaction that takes place when kaolin clay is utilized as the sole source of silica and alumina can be represented by the following equation wherein the approximate chemical formula for kaolin (without the water of hydration) is given as $Al_2O_3 \cdot 2SiO_2$, and the formula for mullite is $3Al_2O_3 \cdot 2SiO_2$:

$3(Al_2O_3 \cdot 2SiO_2) \rightarrow 3Al_2O_3 \cdot 2SiO_2 + 4SiO_2$.

The term represented by $4SiO_2$ is the free silica generated as a result of the conversion to mullite.

Mullite is widely used in ceramic applications such as in the manufacture of refractory grains. For these applications, dense impervious products are needed and porosity is undesirable. See, for example, U.S. Pat. No. 3,642,505. It is known that a purified form of mullite can be obtained by calcining suitable clay such as kaolin, and extracting the silica with a strong base. See, for example, U.S. Pat. No. 2,536,122 and Japanese Patent Application No. 69 84,626 (CA81(10)53673a). It is our understanding that removal of the free silica in this fashion (or by reaction with sources of $Al_2O_3$ to form additional mullite) is practiced to improve the refractoriness of the resultant solid. In this regard, it is noted that the $Al_2O_3$-$SiO_2$ phase diagram (Phase Diagrams for Ceramists, Amer. Cer. Soc. Ed., 1964, Diagrams 313–314) shows that pure mullite does not melt until about 1850° C.; however, in the presence of free silica, melting begins at only about 1600° C. Therefore, by eliminating free silica, the refractoriness of mullite is improved to an extent such that the melting point is about 250° C. higher.

Copending U.S. application, Ser. No. 505,650, filed June 20, 1983 in the name of Barry K. Speronello, describes novel particulate aggregates in the form of shaped bodies, such as microspheres, and comprising mullite crystals as the sole or predominating solid component, the products being characterized by relatively high surface area; e.g., greater than about 15 m²/g, high pore volume, e.g., greater than about 0.22 cc/g, and a high concentration of pores in the range of 150 to 350A (Angstrom) diameter. The aggregates are prepared by leaching silica from preformed shaped bodies of clay calcined to form mullite and free silica by means of a caustic solution, preferably sodium hydroxide. Representative products described in Ser. No. 505,650 analyze at least about 50% mullite, as determined by X-ray analysis, and preferably at least 75% mullite, and most preferably at least 85% mullite. This corresponds to a molar ratio of $Al_2O_3/SiO_2$ that is in excess of 0.5, usually in excess of 1.00 and up to about 1.65. The $Al_2O_3$/$SiO_2$ molar ratio of high purity kaolin clay is about 0.5.

The aforementioned patent application further describes preferred uses for the porous mullite products as being those taking advantage of their unique combination of high pore volume (particularly mesoporosity), controllable surface area (from moderate to high, e.g., from 15 to 60 m²/g), excellent refractoriness and high strength. Disclosures of preferred uses include supports for catalysts used to oxidize carbon monoxide or hydrocarbons. Also disclosed in said patent application is that microspherodial porous mullite articles having a surface area between about 20 m²/g and 50 m²/g and hardness at least comparable to that of commercially useful fluid cracking catalysts may be useful as a support for a precious metal for the oxidation of carbon monoxide in the regenerator of a FCC unit. The application further disclosed that the CO oxidation promoter can be made by impregnating porous mullite microspheres to incipient wetness with a chloroplatinic acid solution of appropriate concentration to result in from about 100 to 500 ppm of Pt being deposited on the support.

THE INVENTION

The present invention results from the surprising and presently unexplainable discovery that palladium is unusually effective in promoting the oxidation of carbon monoxide to carbon dioxide under conditions such as those that prevail in the regenerators of FCC units when the palladium is supported on particles of leached mullite. The palladium may be the sole catalytically active metal component of the promoter or it may be mixed with other metals such as platinum. However, the superiority of the support is not evident when platinum is the sole metal.

The present invention provides novel products for promoting the combustion of carbon monoxide in catalytic cracking units, especially FCC units. The improved products of the invention comprise palladium deposited on a porous silica-alumina support obtained by leaching sufficient silica (and optionally alumina) from shaped particles of calcined clay with caustic solution to impart porosity to the support particles. One or more precious metals (group VIII metals and rhenium) may be present with the palladium. The precious metal(s) may be present as elemental metal(s) or compound(s) thereof. The calcined clay from which silica is leached to impart porosity is preferably kaolin clay that has been calcined at a temperature and for a time sufficient to convert the clay into mullite and silica, whereby the support particles consist essentially of mullite crystals. The support particles preferably have a $Al_2O_3/SiO_2$ molar ratio in the range of about 1.58 to 1.64, a total pore volume in excess of 0.15 cc/g, a surface area in excess of 15 m$^2$/g, most preferably in the range of 20 to 60 m$^2$/g, and a pore structure in the range of 100 to 600A characterized by a pore volume in that range in excess of 0.1 cc/g and the greatest volume of porosity in that range centered around a pore diameter in the range of 150A to 350A.

Generally, the promoter particles contain at least 10 ppm palladium and from 25 to 2000 ppm precious metal (total), preferably from 50 to 600 ppm precious metal (total), and most preferably from 300 to 500 ppm (total) precious metal.

We believe that the activity per unit of precious metal (defined hereinafter) in products of the invention will exceed substantially that of other promoters including promoters presently used commercially. This may represent a cost saving to refineries utilizing carbon monoxide oxidation promoter in which a precious metal is employed. The possibility of using a lower level of precious metal to achieve a desired level of increased carbon monoxide combustion may result in the minimization of possible undesirable effects of the presence a precious metal during the cracking cycle. Also, it is well known that palladium is available at a lower cost than platinum.

PREFERRED EMBODIMENTS

A. PREPARATION OF SUPPORT FOR PRECIOUS METAL PROMOTER

Clays that are suitable for conversion into porous mullite are those which, upon calcination, are converted into mullite and free silica, e.g., kaolinites, halloysites, smectites, and illites. Prior to calcination, the clay is formed into agglomerates of a size and shape corresponding substantially to the size and shape of the support particles. For example, when the promoter product is to be used in the form of a fluidizable solid, the clay is spray dried to form microspheres which are calcined and then leached. The particle size distribution of the clay and its degree of agglomeration in the green bodies influence the macropore structure of the calcined body prior to leaching and this macroporosity is retained in the porous mullite after leaching.

It is helpful for the calcined bodies to contain some porosity prior to leaching, because porosity accelerates the diffusion of reactants and products of the leaching reaction into and out of the bodies, and thereby shortens the necessary leaching time. The particle size and degree of agglomeration of clay used to produce porous mullite shapes is a compromise between maximum strength (i.e., minimum porosity) and high macroporosity to aid diffusion. Clays with broad particle size distributions generally produce minimum porosity prior to leaching. An example of such a clay is ASP ® 900 hydrous kaolin, which contains particles up to 20 um (micrometers) in diameter, an average particle size (weight basis) of ca. 1.5 um, and about 25% by weight of particles finer that 0.5 um. Clays with a narrower particle size distribution do not pack as efficiently as clays having a broader particle size distribution, resulting in a greater quantity of macroporosity. An example of such a clay is ASP ® 400 hydrous kaolin, which contains particles up to 20 um in diameter, an average particle size of ca. 5 um, and nothing <0.5 um. A good compromise between these extremes, which results in about 0.1–0.15 cc/g of macroporosity in microspheres after calcination to mullite, is ASP ® 600 hydrous kaolin which contains nothing coarser than about 8 um, has an average particle size of 0.9 um, and contains 35% by weight of particles <0.5 um. (As used herein, all particle sizes of hydrous clays in the micron-size range are those determined by sedimentation and are therefore expressed as "equivalent spherical diameter" or "e.s.d" in conventional manner.)

Macroporosity can also be increased by incorporating powdered calcined clay into the raw material mixture that is formed into the shaped bodies. It is believed that the calcined clay contains a significant amount of porous agglomerates that do not break down during typical forming operations. Therefore this porosity is retained in the shaped bodies. If it is desired, about 0.2–0.3 cc/g of macroporosity can be added to the shaped body by replacing about 50% of the hydrous clay with calcined clay such as Satintone ® No. 1 or Satintone ® No. 2 clays. Normally, however, there is sufficient porosity in the agglomerates of hydrous clay and the addition of calcined clay is unnecessary.

Macroporosity may also be incorporated into the shaped bodies through the use of carbonaceous burn-out agents. Burn-out agents are particulate materials of the approximate size and shape of the desired pores which are mixed with the other raw materials prior to forming the shaped body. During calcination, the burn-out materials burn substantially away, thereby imparting porosity. Some common burn-out agents are ground walnut shells, ground peanut shells, flours and carbon black.

We have successfully used high purity clays that were low in iron, titania, alkalies, and free alumina. Transition metal impurities such as iron could conceivably catalyze undesirable dehydrogenation reactions that can result in the formation of excess clay and hydrogen. Alkali metal oxide impurities might be undesirable because they are fluxes which can cause excessive sintering of the shaped bodies during the calcination step. Excessive sintering can undesirably extend the time required to leach free silica from the bodies. Free alumina is undesirable because it can react with free silica from the clay to form mullite, and thereby reduce the quantity of free silica that may be leached from the body to form desirable mesoporosity. Presently preferred are high purity, water-washed kaolinitic clays from deposits of the type found in Georgia, such clays typically having a $SiO_2/Al_2O_3$ molar ratio of about 2/1 and containing, on a volatile-free weight basis, less than 2% $TiO_2$, less than 2% iron (measured as $Fe_2O_3$) and less than 1% total alkali and alkaline earth oxides.

B. FORMING

Forming can be conducted by conventional processes known in the art. Microspheres can be formed by spray drying a deflocculated slurry of clay in water. In addition, a fugitive binder, such as polyvinyl alcohol, may be added to the slurry prior to spray drying to impart additional strength to the green microspheres prior to calcination. The preferred method to form microspheres is to prepare a slurry containing about 60 to 65 wt % of finely-divided, high purity hydrous kaolin clay (e.g., ASP® 600 clay), 0.3 wt % tetrasodium pyrosphosphate (deflocculating agent) and water; and to spray dry the slurry using a spray dryer operating with a gas inlet temperature of about 540° C. and an outlet temperature of about 120° C. This results in microspheres in the FCC particle size range of 20 to 150 um, preferably 40 to 100 um (average 70 to 80 um). Prior to calcination, such microspheres are characterized by about 0.25 cc/g of macroporosity and essentially no meso- or microporosity. If a greater quantity of macroporosity is desired, some of the hydrous kaolin clay may be replaced by calcined kaoln clay as mentioned above. For example, if about ½ of the hydrous clay described above is replaced with Satintone® No. 1 clay, the resultant spray dried microspheres will contain about 0.5 cc/g of macroporosity.

C. CONVERSION TO MULLITE AND SILICA

Control of calcination conditions (time and temperature) influences several properties, including:
(1) sintering of the shaped body, (which influences both leachability and the macropore volume of the porous mullie product);
(2) the degree of clay conversion to mullite and free silica; and
(3) the pore size in the mesopore (100-600A diameters) region and surface area of the porous mullite product.

Suitable calcining temperatures are those which give conversion of clays to mullite plus free silica in practically useful times. Good results have been achieved by calcining for as long as about 16 hours at 1150° C., or for about a time as short as <1 hour at about 1350° C. Below about 1150° C. the time required for conversion from clay to mullite plus free silica is generally unnacceptably long. At or above 1350° C. sintering can be excessive, thereby reducing porosity of the calcined body and extending the required leaching time.

Within the range of useful calcining times and temperatures, calcination time and temperature may be used to control the surface area and average pore size in the mesopore range (100-600A diameter) of the porous mullite product. Increasing calcining time and/or temperature results in a leached porous mullite product of lower surface area and larger mesopore size. Finally, increasing the calcining time and temperature improves the strength and attrition resistance of the porous mullite product.

D. SILICA REMOVAL

Free silica is removed from the calcined bodies by leaching with strong alkali solutions. Removal of this free silica results in the formation of porosity in the mesopore size range and an increase in surface area in the resultant product. The solubility of silica increases sharply when the pH of the leaching solution reaches about 11, and solubility continues to increase with increasing pH. Silica solubility is not particularly sensitive to the cation associated with the hydroxyl ion. Therefore preferred leaching reagents are those providing the highest pH at the least cost. Good results have been obtained using aqueous solutions containing 10–25% by weight NaOH.

Silica solubility also increases with increasing temperature; therefore, it is advantageous to conduct the leaching step at as high a temperature as possible. However, to avoid the need for costly high pressure reactors, it is advantageous to leach at temperatures at or below the boiling point of the leaching solution. Good results have been obtained using a leaching temperature of about 80° C.

Leaching time is dependent upon several factors including:
(1) the quantity of free silica to be removed;
(2) the porosity of the body prior to leaching;
(3) concentration of the leaching solution; and
(4) temperature of leaching.

With microspheres containing about 0.1–0.15 cc/g of macroporosity prior to leaching, about 1 hour of leaching with 25% NaOH solution at 80° C. was sufficient to achieve equilibrium conditions. Three such leaching steps were sufficient to remove essentially all free silica.

When leaching microspheroidal bodies, it is preferred to form a slurry of the microspheres in the leaching solution and to stir the slurry slowly to maintain the microspheres in suspension and to insure good agitation of the reagents. It is impractical to stir mixtures of the leaching solution when removing silica from larger shaped bodies such as pellets or honeycombs. Therefore, it is preferable to pump the leaching solution through a bed of the larger shaped bodies.

Complete removal of free silica typically results in the formation of about 0.25 cc/g of mesoporosity. If less than 0.25 cc/g of mesoporosity is desired, it may be realized by terminating the leaching procedure prior to complete removal of silica. Partial leaching will also result in a somewhat lower surface area for the leached product and a somewhat smaller pore size in the mesopore range.

The mullite bodies of this invention contain a small amount of alkali metal after the leaching procedure. Preferably, the alkali metal concentration is reduced to about 0.1% by weight $Na_2O$ expressed on a volatile free (VF) weight basis, by extensive washing or by contacting the mullite with an aqueous solution containing hydrogen ions or precursors thereof in sufficient concentration and for a time long enough to effect the desired reduction in alkali metal content.

E. IMPREGNATION OF PRECIOUS METAL COMPOUND ON SUPPORT PARTICLES

Simple impregnation of the leached calcined microspheres with a solution of a soluble precious metal compound followed by drying will suffice to achieve effective deposition of the trace precious metal compound on caustic leached microspheres (since these microspheres have adequate porosity for uniform deposition of trace amounts of an impregnant). However, the microporosity of the calcined microspheres is sufficiently low to minimize coke deposition in the cracking zone of a FCC unit. Organic or aqueous solutions of precious metal compounds can be used.

The precious metal compound may be one in which the precious metal is in the anion, for example chloroplatinic acid, or the precious metal may be in the cation, for example Tris(ethylenediamine)platinum(IV) tetrachloride. Typical inorganic compounds that are suitable sources of platinum and/or palladium include ammonium palladium hexachloride, palladium chloride, diamminedichloropalladium, diamminedinitropalladium, tetraamminepalladium chloride, tetraamminepalladium hydroxide, palladium nitrate, palladium acetate, ammonium platinum hexachloride, chloroplatinic acid, diamminodichloroplatinum, diamminedinitroplatinum and tetraammineplatinous hydroxide. Typical organic compounds include palladium acetylacetonate, tetrakis(triphenylphosphino)palladium, dichloro(ethylene)palladium(II) dimer, platinum acetylacetonate, dichlorodicarbonylplatinum(II) and trimethylplatinum chloride.

When combinations of palladium and one or more other precious metals, such as platinum, are used, both metals are preferably impregnated on the same microspheres of leached calcined clay. It is within the scope of the invention to impregnate palladium on a portion of microspheres of leached calcined clay, impregnate another portion of the microspheres with at least one different precious metal, such as platinum, osmium, iridium, rhenium or rhodium, and then blend the microspheres, using suitable proportions to provide a product containing sufficient palladium and a desirable total concentration of precious metal.

The weight ratio of precious metal other than palladium, e.g., platinum, to palladium is in the range of 0 to 10, most preferably about 0.

The microspheres should be agitated during impregnation with the solution of precious metal compound. It may be desirable to fix the metal onto the support; therefore, after the precious metal compound is applied as a solution, a drying step can serve to fix the metal on the support. If desired, the precious metal(s) may be reduced to elemental metal(s) by treatment with a suitable reducing agent prior to introduction into the regeneration of a cracking unit.

The level of precious metal in a blend of promoter particles and separate catalyst particles is usually in the range of 0.5 to 10 ppm (based on the total mixture) when full combustion is desired. From 0.5 to 3 ppm are recommended for use in units operating with partial combustion. The suitable level of precious metal will vary with the design of a particular regeneration system.

Promoter particles of the invention may contain components in addition to precious metal(s) and support. As nonlimiting examples may be cited the presence of compounds of boron or phosphorus.

F. DEFINITION AND DETAILS OF TEST PROCEDURES USED HEREIN

Identification of mullite crystal phase using X-ray powder diffraction:

X-Ray Powder Diffraction File, Card No. 15-776, Leonard G. Berry (Ed.), Joint Committee on Powder Diffraction Standards*, 1972 was used as the reference for the mullite X-ray powder diffraction pattern.
*1601 Park Lane, Swarthmore, Pa. 19081

Surface Area and volume of pores in range of 20-100A

The surface area and the volume of pores having diameters in the range of 20-100A were determined by conventional nitrogen adsorption and desorption techniques, respectively, using a Micromeritics ® Digisorb 2500 Automatic Multi-Gas Surface Area and Pore Volume Analyzer. Before being tested for surface area and volume of pores having diameters in the range of 20-100A, the material being tested was first pretreated by heating under vacuum at about 250° C. for 16 hours.

Volume of Pores in range of 100-600A and 600-20,000A

The volume of pores having diameters in the ranges of 100-600A and 600-20,000A were determined by a conventional mercury intrusion porosimetry technique using a scanning mercury porosimeter manufactured by Quantachrome Corp. The relationship between pore diameter and intrusion pressure was calculated using the Washburn equation and assuming a contact angle of 140° and a surface tension of 484 ergs/cm$^2$. Before being tested for volume of pores having diameters in the range of 100-600A and 600-20,000A, the materials being tested were pretreated by heating them in air to about 350° C. for one hour and then cooling them in a dessicator.

Liquid Pore Volume

The total volume of pores measured by impregnating to incipient wetness with water.

Micropores

Pores having diameters below 100A as determined by nitrogen adsorption.

Mesopores

Pores having diameters in the range of 100 to 600A by mercury intrusion.

Macropores

Pores having diameters in the range of 600 to 20,000A by mercury porosimetry.

Precious Metal Content

Palladium content was determined by D. C. plasma analysis. Platinum content was determined by colorimetric analysis. Unless otherwise mentioned the concentration of precious metal is reported as parts per million (ppm) based on the weight of solid promoter (metal plus support), the weight of the solid promoter being on a volatile free (VF) weight basis.

LOI=Loss on Ignition—Loss of weight of a material upon heating to 1000° C. for 1 hour.

Volatile free (VF) weight—The weight of a material not including any vaporizable components, calculated from LOI.

EAI=Engelhard Attrition Index. The procedure is described in a publication entitled "Engelhard Attrition Index". The publication is publically available at the Library of the Technical Information Center, Engelhard Corporation, Edison, N.J. 08818 (Dewey Decimal Number 665.533 ECH). Access to this Library, including this publication, can be obtained by writing or telephoning the Manager of the Technical Information Center. In addition, a copy of this publication can be obtained by writing to the Patent Department, Minerals and Chemicals Division, Engelhard Corporation.

Steam Deactivation

The steaming procedure is the "open system" procedure that is described in "Engelhard Procedure For the Hydrothermal Deactivation of Fluid Catalytic Cracking Catalysts" (hereinafter the "hydrothermal deactivation procedure"). This publication has also been deposited at the Library of the Technical Information Center, Engelhard Corporation, Edison, N.J. 08818 (Dewey Decimal Number 665.533 EC/H). Access to this Library and a copy of this publication can be obtained as described above.

The following examples are given to further illustrate the invention, which is not to be construed as being limited to the specific compositions and preparations described therein.

In the examples, microspheres of leached porous mullite support (hereinafter "LMM" support) were prepared, using as a starting material, a supply of microspheres of kaolin clay that had been previously calcined at a temperature above the characteristic kaolin exotherm to produce a spinel phase but below the temperature at which appreciable mullite formed. These microspheres were air classified to remove most −40 um particles, producing +40 um "spinel microspheres" (hereinafter "SM"). To produce the LMM support, SM was calcined under conditions to produce mullite and silica. Thereafter silica was leached from the microspheres to produce LMM.

Microspheres similar to those in the supply of "SM" microspheres can be prepared as follows. A fine size fraction (about 80% by weight finer than 2 microns, equivalent spherical diameter) of high purity hydrated Georgia kaolin clay such as ASP ® 600 clay is formed into a 62.5 percent solids deflocculated aqueous slip by agitating the clay in water in the presence of tetrasodium pyrophosphate in amount of about 0.5 percent of the clay weight. The slip is spray dried to produce microspheres in the size range of about 20 um to 150 um employing air inlet and outlet temperatures of approximately 1100° and 450° F., respectively. The microspheres of hydrated kaolin clay are calcined in a muffle furnace or a rotary calciner just past the characteristic exotherm to convert the clay into the so-called "spinel phase" by exposing the microspheres to temperatures in the range of about 1800° C. to 2000° C. for a time in the range of about ½ to 2 hours. Following calcination, most of the −40 um particles are removed by either air classification using a cyclone separator or by screening on a 325 mesh screen.

EXAMPLE 1—PREPARATION OF "LMM" SUPPORT

One thousand (1000) g of "SM" was calcined in a muffle furnace to mullite plus silica at 2300° F. for 7 hours. After cooling, the microspheres were screened through a 100 mesh (Tyler) screen to remove particles coarser than 100 mesh. Nine hundred (900) g of the microspheres was slurried in a solution of 750 g NaOH in 2250 ml $H_2O$ at 160°0 to 180° F. for 1 hour. The slurry was filtered and the solids were washed with 3 L of $H_2O$. The solids were leached with the NaOH solution, filtered, and washed (as above) two more times. For the final wash 1 L of 10% NaOH was used prior to the 3 L of $H_2O$. The solids were slurried in 2.5 L of $H_2O$ and the pH was adjusted to pH4 with 35% $HNO_3$ (1:1 $HNO_3:H_2O$) for 10 minutes, then filtered and washed with 3 L of $H_2O$. The final product was oven dried overnight at 242° F.

| CHEMICAL COMPOSITION* | |
|---|---|
| Loss on Ignition | 0.081 |
| $Al_2O_3$ | 69.2 |
| $SiO_2$ | 26.1 |
| $Fe_2O_3$ | 0.61 |
| $TiO_2$ | 2.54% |
| $Na_2O$ | 0.06% |
| Pore Vol. Distribution | |
| 20–100 A | 0.008 cc/g |
| 100–600 A | 0.106 cc/g |
| Surface Area = 23 m²/g | |
| Engelhard Attrition Index = 1.1 | |

*Determined by X-ray fluorescence except for $Na_2O$ and LOI. $Na_2O$ is determined by atomic absorption.

EXAMPLE 2—PREPARATION OF PALLADIUM ON "LMM"

Ten (10) ml of 0.5% Pd solution ($PdCl_2+2$ equivalents HCl) was diluted to 39.5 ml total volume and added to 100 g of the LMM support of Example 1. The impregnated support was mixed by rolling in a closed glass jar for 2 hours. The product was dried for four hours at 93°–100° F. in a rotating vessel, then oven dried at 259° F. overnight. The promoter was analyzed as containing 498 ppm Pd (VF basis).

EXAMPLE 3—PREPARATION OF PLATINUM PLUS PALLADIUM ON "LMM"

Ten (10) ml of 0.5 wt % Pt solution ($H_2PtCl_6$) plus 1.0 ml of 0.38% Pd solution ($PdCl_2+2$ equivalents of HCl) were diluted to 42 ml (total volume). One hundred (100) g LMM support was impregnated with this solution. The impregnated support was mixed and dried as in Example 2. The promoter was analyzed as 494 ppm Pt and 38 ppm Pd (VF basis).

EXAMPLE 4—PREPARATION OF PLATINUM ON "LMM"

Three and one-half (3.5) ml of 0.5% Pt solution ($H_2PtCl_6$) was diluted to 12.4 ml total volume and used to impregnate 35 g of the LMM support of Example I. The product was mixed and dried as in Example 2. The promoter was analyzed as containing 461 ppm Pt (VF basis).

EXAMPLE 5—PREPARATION OF PALLADIUM ON SM SUPPORT

Ten (10) ml 0.5 wt. % Pd solution ($PdCl_2$ +2 equilivents HCl) was diluted to 13 ml and used to impregnate 100 g of SM. Palladium analysis was 465 ppm (VF). LOI was 11.45%.

EXAMPLE 6—PLATINUM PLUS PALLADIUM ON "SM" SUPPORT

Eighty (80) ml of 0.5 wt. % Pt solution ($H_2PtCl_6$) plus 8.0 ml of 0.5 wt. % Pd solution ($PdCl_2+2$ equivalents HCL) were combined and diluted to a total volume of 104 ml. Twenty nine (29) ml of this solution was added to 200 g of SM by spraying the solution onto the support in an open rotating stainless steel vessel. The sample was mixed (by rolling in the closed glass jar) for 10 minutes. The sample was analysed as containing 478 ppm Pt (VF) 45 ppm Pd (VF). LOI was 10.4%.

EXAMPLE 7—PREPARATION OF PLATINUM ON SM SUPPORT

This sample was prepared by diluting 80 ml of 0.5 wt. % Pt solution ($H_2PtCl_6$) with 24 ml $H_2O$ and adding 27.4 g of this solution to 200 g of SM in an open rotating stainless steel vessel. Platinum analysis was 472 ppm (VF). LOI was 9.85%

EXAMPLE 8—PREPARATION OF TRANSITION ALUMINA SUPPORT

Six hundred (600) g of Alcoa C-30 hydrated alumina (gibbsite) was steamed at 1400° F. for 4 hours in 100% steam to produce a transition alumina support. The product had a surface area of 89.5 m²/g and a 0.64 EAI. Average particle size was 80 um with 2%<20 um, 6%<40 um, 21%<60 um and 48%<80 um. Liquid pore volume was 0.278 cc/g.

EXAMPLE 9—PREPARATION OF PALLADIUM ON ALUMINA

Five and three tenths (5.3) g of 0.38 wt. % Pd ($PdCl_2$+2 equivalents HCl) was diluted to 10 ml. Forty (40) g of a sample of the alumina support of Example 8 was impregnated with the solution and dried as in Example 2. Palladium was analyzed as 481 ppm (VF). LOI was 2.00%.

EXAMPLE 10—PREPARATION OF PLATINUM PLUS PALLADIUM ON ALUMINA SUPPORT

Four (4.0) ml of 0.5 wt % Pt solution ($H_2PtCl_6$) plus 0.56 ml of 0.38% Pd solution ($PdCl_2$+2 equivalents HCl) was diluted to 10 ml. Forty (40) g of alumina (from Example 8) was impregnated with the solution and dried as in Example 2. The material was analyzed as containing 454 ppm Pt (VF) 52 ppm Pd (VF). LOI was 2.07%.

EXAMPLE 11—PREPARATION OF PLATINUM ON ALUMINA SUPPORT

Four (4.0) ml of 0.5 wt % Pt solution ($H_2PtCl_2$) was diluted to 10 ml. Forty (40) g of the alumina support (from Example 8) was impregnated with the platinum solution. The sample was impregnated and dried as in Example 2. The sample was analyzed as containing 456 ppm Pt (VF). LOI was 2.13%.

EXAMPLE 12—COCAT®-5 (Control)

A sample of COCAT®-5 promoter supplied by Engelhard Corporation was used as a control. The product was analyzed as containing 604 ppm Pt (VF) and 11% free moisture.

EXAMPLE 13—CONTROL

A competitive promoter supplied under the trade designation "CP-3" was obtained for use as a control. The material was analyzed as containing 585 ppm Pt (VF). Chemical analysis (VF basis) was 99.8% $Al_2O_3$; 0.34% $SiO_2$; 0.02% $Fe_2O_3$; 0.20% $TiO_2$; and LOI 4.09%. The EAI was 0.41. Surface area was 107 m²/g. Average particle size was 77 um.

TESTING OF PROMOTERS

An assessment of simulated aging of promoters in laboratory promoter tests based on a study of promoted equilibrium FCC catalysts led one of the inventors to the conclusion that an activity test without promoter aging would give little indication of refinery activity and that promoters should be evaluated by a test which would predict promoter performance after moderate aging. It was found that treatment in a fixed fluid bed unit in the presence of steam at 1350° F. for 4 hours followed by coking and regenerating the sample would provide a realistic simulated aging (equivalent to several days in an FCC unit). Consequently, all performance data reported herein was carried out after promoter products underwent a simulated aging including steaming, coking, and regeneration, except where noted. All blending was done with presteamed (1475° F., 4 hours, 100% steam) HEZ ™-33 catalyst manufactured by Engelhard Corporation. Further details of the simulated aging follow.

1. Forty nine (49) g of presteamed HEZ-33 cracking catalyst was added to a 1350° F. steamer followed by 1.00 g promoter. The mixture was steamed for 4 hours. Addition of promoter directly to the steamer simulates addition of promoter directly to an FCC regenerator. For promoters which contain free moisture, drying occurs very quickly under these conditions whereas premixing the promoter with the dry catalyst used for blending would cause slow drying by desiccation.

2. Six (6.0) g of the resulting steamed mixture of promoter and cracking catalyst was then coked in a MAT unit which is used routinely for catalyst testing of FCC catalysts. The sample was coked by cracking a Mid-continent gas-oil at 910° F., using a catalyst-to-oil ratio of 5, and a weight hourly space velocity of 15.

3. The coked and uncoked promoted catalyst samples were blended with a mixture of coked and uncoked non-promoted catalyst to make final test samples with a precious metal concentration of 0.1 ppm and a final coke level of 0.48% (based upon carbon analysis and assuming a carbon to hydrogen mole ratio of one). The mixture of coked and uncoked non-promoted catalyst consisted of HFZ-33 catalyst which had been steamed at 1475° F. for four hours. Two hundred (200) g portions of this catalyst were coked in a fixed fluid bed reactor by cracking a mid-continent gas-oil at 950° F. (initial) at a weight hourly space velocity of 4.8 h$^{-1}$ and a catalyst-to-oil ratio of 5.0. Coked and uncoked samples were premixed to 0.48% coke and used for blending with promoted sample.

4. A 4.0 g sample of the test sample was heated to 670° C. (1238° F.) under 400 cc/min $N_2$ in a fixed fluid bed reactor.

5. The sample was regenerated in 200 cc/min of air for 10 min.

6. Test gas containing 5% CO, 5% $CO_2$, 3% $O_2$ and the balance $N_2$ was passed over the sample at 400 cc/min and effluent % CO was monitored by an infrared (ir) analyzer. The ir analyzer was calibrated once each day.

Activity Calculation

1. A standard 500 ppm Pt/SM promoter was tested after blending to several Pt levels, 0 to 0.4 ppm.

2. A plot of % CO reduction/ (100—% CO reduction) vs. ppm Pt was fit with a least squares line. (The choice of this function was empirical.)

3. % CO reduction/ (100—% CO reduction) of the experimental promoter run at 0.1 ppm metal was compared to the plot to determine the ppm Pt of the standard needed to equal the CO reduction performance of the experimental promoter at 0.1 ppm metal.

4. Activity of the experimental promoter was proportional to the Pt content of standard Pt/SM promoter needed to equal the CO reduction performance of the experimental promoter at 0.1 ppm metal. This was a measure of activity per metal weight of the promoter.

The results of the evaluations for materials described in the foregoing examples are summarized in Table I.

TABLE I

EFFECTS OF PRECIOUS METAL SPECIES AND SUPPORT COMPOSITION ON PRECIOUS METAL ACTIVITY

|  | Metal | | |
|---|---|---|---|
|  | Pd | Pt + Pd | Pt |
|  | Activity Per Metal Weight | | |
| Leached Mullite Microspheres (LMM) (Ex. 1) | 4.5 (Ex. 2) | 3.6 (Ex. 3) | 2.3 (Ex. 4) |
| SM | 1.8 (Ex. 5) | 2.1 (Ex. 6) | 2.2 (Ex. 7) |
| Al₂O₃ (Ex. 7) | 1.6 (Ex. 7) | 1.6 (Ex. 9) | 1.2 (Ex. 10) |
| Commercial Promoters | | | |
| COCAT ®-5 | | | 1.7 (Ex. 12) |
| CP ™-3 | | | 1.2 (Ex. 13) |

Performance data summarized in Table I show the following:

1. Promoter made with palladium on LMM support (Ex. 2) was far more active than all experimental and commercial platinum based promoters.
2. This advantage appears both when palladium was used alone (Ex. 2) or in combination with platinum on this support (Ex. 3).
3. Palladium had comparable or somewhat higher activity per weight than platinum on SM and alumina supports. This was unexpected in view of the prior art. (Compare results with the promoters of Ex. 9 and 11). Nevertheless, only palladium on leached mullite microspheres outperformed all platinum based promoters, including all commercial promoters.

In these examples, promoters made on "SM" support and COCAT ®-5 promoter were not dried following impregnation with precious metal solutions. Studies have shown that predrying these promoters before testing does not improve their activity and can be detrimental with certain drying conditions. Promoters on other supports were predried, as is generally done in the art to "fix" the precious metal on the support. Activity tests on undried promoters made with palladium and platinum on LMM support showed reduced activity.

Activity tests of promoters made with LMM support which were done without simulated aging (eg. no 1350° F. steaming, coking, and regeneration) did not yield results parallel to the results in Table I. Specifically, palladium on LMM (Ex. 2) had low activity although platinum plus palladium (Ex. 3) on LMM still was superior to all platinum based promoters. Further investigation revealed that while palladium/LMM made from palladium chloride had a low unaged activity, a promoter made with palladium nitrate on LMM did not.

It is believed that the initial stages of aging activates promoters made from palladium chloride and LMM. Any of a variety of pretreatments can improve the unaged activity of palladium chloride/LMM without affecting its test activity after aging. These include 1350° F. 4 hour calcination, 1350° F. 4 hour steaming, or coking-regeneration prior to use. Since these pretreatments simulate the environment in an FCC unit, we believe they should not be needed as an additional production step. In addition, as a result of the discrepency between relative activities measured with and without simulated aging, a study was done to characterize promoter activity in a FCC unit based upon CO oxidation catalytic activity of promoted equilibrium samples. Based upon the results of this study, we believe that an activity test without simulated aging has little value for predicting field preformance.

EXAMPLE 14—FACTORS AFFECTING PERFORMANCE

Confirmation of the high activity of palladium/LMM promoters and characterization of some of the factors affecting their performance were made from activity measurements on a series of promoters made with varied syntheses of the support and/or with variation of the palladium concentration. The factors which were varied were:

(1) Support surface area (23 vs 33 m²/g)
(2) Palladium concentration (300 vs 500 ppm)
(3) Drying (100° F. with mixing vs 300° F. oven)
(4) Palladium salt used (nitrate vs cloride)

Results of the activity measurements of those promoters are given in Table II.

TABLE II

FACTORS AFFECTING PALLADIUM/LMM PERFORMANCE

| Palladium Promoter[1] | Activity[2] |
|---|---|
| 500 ppm Pd on 23 m²/g LMM slow dried 100° F. | 4.6 |
| 500 ppm Pd on 33 m²/g LMM slow dried 100° F. | 5.3 |
| 300 ppm Pd on 23 m²/g LMM slow dried 100° F. | 4.6 |
| 500 ppm Pd on 23 m²/g LMM oven dried 300° F. | 4.5 |
| 500 ppm Pd as Pd(NO₃)₂ on 23 m²/g LMM | 5.3 |
| Control | |
| Cocat ®-5 | |

[1]PdCl₂ used except where noted
[2]Pooled relative standard deviation among replicate tests of each promoter was 12%. Promoters were synthesized in duplicate. Pooled relative standard deviation among average activities of replicate syntheses was 14%

Data in Table II show that the average activity of all of the palladium leached mullite promoters was 4.9. These promoters were 2.9 times as active per metal weight as the control promoter (activity 1.7).

We believe that none of the differences in activity among promoters made with palladium only in Table II is statisitically significant because of a 14% relative standard deviation among replicate syntheses.

EXAMPLE 15—VARIATIONS IN SUPPORT

In an attempt to understand why leached mullite is a good support for palladium, variations on the supprt synthesis were made. Promoters were prepared using the following as supports; microspheres composed of unleached mullite plus silica (SM calcined 4 hours to 2300° F.); leached commercial mullite; leached SM; and LMM calcined at 1000° F. Details of the preparation of leached commercial mullite and of leached SM are given below in Examples 16 and 17, respectively. Promoters were prepared by impregnation to incipient wetness with solutions of precious metal compounds, followed by drying using the same procedures previously described in connection with the preparation of experimental promoters. Activities of these promoters are shown in Table III.

EXAMPLE 16—PREPARATION OF CAUSTIC LEACHED COMMERCIAL MULLITE

A 250 g sample of −60+325 mesh Mulcoa ® 47 mullite was slurried in a solution of 208.3 g NaOH in 650 ml of H₂O and heated to 170°–180° F. for 1 hour. The reaction product was filtered and washed with 2 L of H₂O. The solid was caustic leached as above two more times except that after the last leaching the product was washed with 500 of ml 10% NaOH followed by 3 L of H₂O. The material was oven dried overnight. The material was reslurried in H₂O and the pH was adjusted to 5.0 for 10 minutes. The reaction product was filtered and washed with 2 L of H₂O, then oven dried at 200° F. for 2 hours.

Properties of the leached mullite are as follows:
LOI=0.33%; 50.06% Al₂O₃; 46.77% SiO₂; 0.82% Fe₂O₃; 2.01% TiO₂
Surface area=1.6 m²/g
EAI=0.15 Liquid pore volume <0.05 cc/g Before leaching the Mulcoa −47 mullite had a surface area of 0.7 m²/g. The relatively small increase in surface area upon leaching indicates an inertness toward leaching compared to the calcined microspheres of Example 1.

EXAMPLE 17—PREPARATION OF MILDLY LEACHED "SM" SUPPORT

Thirty five (35) g NaOH was dissolved in 665 ml H₂O and the solution was warmed to 122° F. Five hundred (500) g of SM was added and the slurry was heated to 171 to 203° F. for 34 min. The mixture was filtered and washed with 1.0 L of H₂O at 158° F. followed by 1.0 L H₂O at room temperature. The solids were reslurried in 1.0 L of H₂O and the pH was adjusted to 7.0 with 35% HNO₃ and maintained for 10 minutes. The mixture was filtered, reslurried in 1.0 L H₂O, filtered and washed. The product was oven dried at 230° F. overnight. Surface area was 28.0 m²/g; EAI=1.0; chemical analysis was 49.2% Al₂O₃; 47.1% SiO₂ (by X-ray fluorescence). Liquid pore volume was 0.346 cc/g.

TABLE III

VARIATION IN PREPARATION OF LEACHED MULLITE SUPPORT ON PROMOTER ACTIVITY

| Support | Activity | |
|---|---|---|
| | 500 ppm Pd | 500 ppm Pt + 50 Pd |
| Leached Mullite Control | 4.8 | 3.6 |
| Unleached Mullite + Silica (2300° calcined SM) | .98 | .76 |
| Leached Mullite Calcined at 1000° F. after leaching) | 4.6 | 4.4(1) |
| Mildly Leached SM (Ex 17) | 1.3 | 2.6 |
| Leached Mulcoa - 47 mullite (Ex. 16) | 1.6 | |

(1)Pooled standard deviation in activity measurements among replicate syntheses was 0.66, with four degrees of freedom. The difference between 4.4 and the control, 3.6, does not have high significance based on the t-test.

Data in Table III shows that promoters prepared on 2300° F. calcined (unleached) SM and on leached commercial mullite had low activities, demonstrating that the presence of mullite per se in the support was not sufficient to give the high activities found for palladium on LMM promoters.

Data in Table III also show that palladium and platinum made a good promoter on mildly leached SM (relative to platinum on SM), but not as good as on leached mullite. Palladium on mildly leached SM had low activity.

Finally, leached mullite was calcined at 1000° F. to dehydroxylate the surface (aluminas dehydroxylate was this temperature). The post-calcined leached mullite surface was not characterized. It was found that both palladium and platinum plus palladium on the post-calcined support made active promoters suggesting (along with mildly leached SM results) that surface hydroxides from leaching did not play a critial role.

EXAMPLE 18—EFFECT OF SULFUR OXIDES

To determine the relative susceptibility of palladium/LMM and a commercial (Cocat-5) promoter to poisoning by SOx, both promoters were tested with 2000 ppm SO₂ added to the standard test gas: results are shown in Table IV. Data in Table IV show that both promoters lost activity in the presence of SOx; however, the percent activity loss was greater for Cocat-5 promoter. In fact, palladium/LMM promoter tested with SOx present was more active than Cocat-5 promoter without the poison. For both samples, exposure of the poisoned promoter to air for two minutes followed by test gas without SO₂ showed the poisoning to be reversible.

TABLE IV

| PROMOTER POISONING BY SOx | | |
|---|---|---|
| Promoter | Control | Palladium/LMM |
| Activity with 2000 ppm SO₂ | 0.62 ± 0.19 | 2.6 ± 0.64 |
| Activity after 2 min air, no SO₂ | 1.8 ± 0.26 | 4.0 ± 0.23 |
| Standard Activity | 1.7 ± 0.17 | 4.2 ± 0.17 |
| % Activity Loss from SOx | 64% | 38% |

We claim:

1. Porous mechanically and thermally stable microspheres consisting essentially of mullite obtained from caustic leached calcined clay, said bodies having palladium impregnated thereon.

2. Fluidizable bodies comprising palladium supported on microspheres consisting essentially of porous mullite obtained by calcining microspheres of clay and leaching silica therefrom.

3. Bodies of claim 2 in which the palladium content is in the range of 10 to 2000 ppm.

4. Bodies of claim 2 consisting essentially of mullite crystals, said bodies having a molar ratio of Al₂O₃/SiO₂ in the range of about 1.58 to 1.64, said bodies being further characterized by having a total pore volume in excess of 0.15 cc/g, a BET surface area in excess of 15 m²/g, and porosity in the range of 100 to 600Å characterized by a pore volume in that range in excess of 0.1 cc/g and the greatest volume of porosity in that range centered around a pore diameter in the range of 150Å to 350Å.

5. Attrition resistant microspheres consisting essentially of mullite, having a molar ratio of Al₂O₃/SiO₂ in the range of about 1.58 to 1.64, an alkali metal oxide content below about 1%, a BET surface area in the range of about 20 to 60m²/g, a total pore volume in excess of 0.15 cc/g and a pore structure in the range of 100 to 600Å characterized by a pore volume in that range in excess of 0.1 cc/g and the greatest volume of porosity in that range centered around a pore diameter in the range of 150Å to 350Å, said microspheres having impregnated thereon a precious metal selected from the group consisting of palladium and mixtures of palladium and at least one other precious metal, the total content of precious metal being in the range of 25 to 2000 ppm.

6. A product useful in promoting combustion of carbon monoxide in a fluid catalytic cracking unit comprising a metal selected from the group consisting of palladium and mixtures of palladium and platinum, said metal being supported on attriton-resistant porous microspheres consisting essentially of porous mullite obtained by calcining microspheres composed of kaolin clay and leaching silica therefrom with a caustic solution in amount sufficient to result in leached microspheres having a surface area in excess of 15 m²/g.

7. The product of claim 6 wherein microspheres having a total pore volume in excess of 0.15 cc/g.

8. The product of claim 6 wherein said precious metal consists of palladium in a concentration in the range of 50 to 600 ppm.

9. The product of claim 8 wherein said concentration is in the range of 300 to 500 ppm.

10. The product of claim 6 wherein the precious metal is a mixture of platinum and palladium in which the weight ratio of platinum to palladium is about 10 to 1 and the total precious metal concentration is in the range of 50 to 600 ppm.

11. The product of claim 10 wherein the concentration is in the range of 300 to 500 ppm.

* * * * *